(12) United States Patent
Xiao et al.

(10) Patent No.: US 12,549,428 B2
(45) Date of Patent: Feb. 10, 2026

(54) DATA PROCESSING METHOD AND RELATED DEVICE

(71) Applicant: HUAWEI TECHNOLOGIES CO., LTD., Shenzhen (CN)

(72) Inventors: Xin Xiao, Nanjing (CN); Yuming Xie, Nanjing (CN); Zhongyu Wang, Nanjing (CN); Yunpeng Gao, Nanjing (CN); Wei Song, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 385 days.

(21) Appl. No.: 17/875,809

(22) Filed: Jul. 28, 2022

(65) Prior Publication Data
US 2022/0376971 A1   Nov. 24, 2022

Related U.S. Application Data

(63) Continuation of application No. PCT/CN2020/108424, filed on Aug. 11, 2020.

(30) Foreign Application Priority Data

Feb. 14, 2020   (CN) .......................... 202010093223.2

(51) Int. Cl.
| | | |
|---|---|---|
| H04L 41/0654 | (2022.01) | |
| H04L 41/0631 | (2022.01) | |
| H04L 41/069 | (2022.01) | |
| H04L 41/14 | (2022.01) | |

(52) U.S. Cl.
CPC ...... *H04L 41/0631* (2013.01); *H04L 41/0654* (2013.01); *H04L 41/069* (2013.01); *H04L 41/14* (2013.01)

(58) Field of Classification Search
CPC . H04L 41/06; H04L 41/0654; H04L 41/0677; H04L 41/069; H04L 41/5009; H04L 41/5025; H04L 43/08
USPC .......................... 370/229, 252; 709/203, 224
See application file for complete search history.

(56) References Cited

U.S. PATENT DOCUMENTS

| | | | |
|---|---|---|---|
| 10,313,221 B1 * | 6/2019 | Leonard | H04L 41/5009 |
| 2001/0049802 A1 | 12/2001 | Shigeta | |
| 2002/0019870 A1 | 2/2002 | Chirashnya et al. | |

(Continued)

FOREIGN PATENT DOCUMENTS

| | | |
|---|---|---|
| CN | 100456687 C | 1/2009 |
| CN | 102640154 A | 8/2012 |
| CN | 105187255 A | 12/2015 |

(Continued)

OTHER PUBLICATIONS

Yang et al., "Mining Data Chain Graph for Fault Localization", 2012 IEEE 36th International Conference on Computer Software and Applications Workshops, Jul. 16, 2012, 6 pages.

*Primary Examiner* — Harun Chowdhury
(74) *Attorney, Agent, or Firm* — Maier & Maier, PLLC

(57) ABSTRACT

A data processing method where an analysis device obtains first network data and historical fault propagation paths and processes the first network data to obtain a first fault propagation path. When the historical fault propagation paths include a target fault propagation path that is the same as the first fault propagation path, the analysis device updates a quantity of target fault propagation paths.

16 Claims, 7 Drawing Sheets

(56) References Cited

U.S. PATENT DOCUMENTS

2017/0126483 A1* 5/2017 Ponnuswamy ......... H04L 43/08
2019/0286504 A1 9/2019 Muntés-Mulero et al.

FOREIGN PATENT DOCUMENTS

| CN | 109861858 | A | 6/2019 |
| CN | 110597726 | A | 12/2019 |
| CN | 110752952 | A | 2/2020 |
| EP | 3541015 | A1 | 9/2019 |

* cited by examiner

DATA PROCESSING METHOD AND RELATED DEVICE

CROSS-REFERENCE TO RELATED APPLICATIONS

This application is a continuation of International Application No. PCT/CN2020/108424, filed on Aug. 11, 2020, which claims priority to Chinese Patent Application No. 202010093223.2, filed on Feb. 14, 2020. The disclosures of the aforementioned applications are hereby incorporated by reference in their entireties.

TECHNICAL FIELD

The embodiments relate to the field of communications technologies, a data processing method and a related device.

BACKGROUND

A network fault means a state in which a network cannot provide normal services or service quality is degraded due to a hardware problem, a software vulnerability, virus intrusion, or the like. For example, in a data center network, faults such as address resolution protocol (APR) threshold exceeding, a device restart, and a router identity (ID) conflict all reduce overall network health and affect services.

In the conventional technology, when a fault propagation path needs to be determined, newly generated network data and all historical network data are processed to obtain a fault propagation path. The fault propagation path is a path on which a fault is propagated in a network.

However, as a time, historical data, and storage costs increase, each time a fault propagation path needs to be determined, all network data (historical network data and newly generated network data) needs to be reprocessed, resulting in low calculation efficiency.

SUMMARY

The embodiments may provide a data processing method and a related device, to implement efficiency that is higher than that of processing all network data, reduce storage costs by storing only a historical fault propagation path instead of storing all historical network data, and implement replicability and scalability.

A first aspect may provide a data processing method. The method includes: An analysis device obtains first network data. The first network data includes information about abnormal events of a plurality of nodes in a network in a first time period and a connection relationship between the plurality of nodes. The analysis device processes the first network data to obtain a first fault propagation path. The first fault propagation path indicates that a first abnormal event of a first node causes a second abnormal event of a second node in the first time period, and the first node and the second node are any two different nodes in the plurality of nodes. The analysis device obtains historical fault propagation paths. The analysis device determines whether the historical fault propagation paths include a target fault propagation path that is the same as the first fault propagation path. The target fault propagation path indicates that a third abnormal event of the first node causes a fourth abnormal event of the second node before the first time period, the third abnormal event and the first abnormal event are of a same event type, and the fourth abnormal event and the second abnormal event are of a same event type. When the historical fault propagation paths include the target fault propagation path, the analysis device updates a quantity of target fault propagation paths.

In this embodiment, the analysis device obtains the first network data and the historical fault propagation paths; processes the first network data to obtain the first fault propagation path; and when determining that the historical fault propagation paths include a second fault propagation path that is the same as the first fault propagation path, updates a quantity of second fault propagation paths. This implements efficiency that is higher than that of processing all network data, reduces storage costs by storing only a historical fault propagation path instead of storing all historical network data, and implements replicability and scalability.

With a first implementation of the first aspect, the target fault propagation path and the first fault propagation path pass through same nodes.

In this embodiment, when the target fault propagation path and the first fault propagation path pass through the same nodes, it is determined that the target fault propagation path is the same as the first fault propagation path, so that subsequent fault locating is more detailed and accurate.

With reference to a second implementation of the first aspect, the analysis device may process the first network data to obtain a first result. The first result includes the first fault propagation path and first duration, and the first duration is obtained by processing a first time interval between an occurrence moment of the first abnormal event of the first node on the first fault propagation path and an occurrence moment of the second abnormal event of the second node on the first fault propagation path in the first time period. The analysis device may obtain historical results. The historical results include a second result, the second result includes the target fault propagation path and second duration corresponding to the target fault propagation path, and the second duration is obtained by processing a second time interval between an occurrence moment of the third abnormal event and an occurrence moment of the fourth abnormal event before the first time period. The analysis device calculates the first result and the second result to obtain target duration. The analysis device updates the second duration to the target duration.

In this embodiment, duration of a fault propagation path is updated in an incremental update manner, to provide a reference for subsequent fault effect duration prediction.

With reference to a third implementation of the first aspect, the analysis device uses maximum duration in the first duration and the second duration as the target duration.

In this embodiment of, the target duration is limited to the maximum duration. This improves solution feasibility.

With reference to a fourth implementation of the first aspect, the first result may further include a first quantity, and the first quantity is a quantity of first fault propagation paths in the first time period; and the second result may further include a second quantity, and the second quantity is a quantity of target fault propagation paths before the first time period. The analysis device obtains the target duration through the calculation in the following manner:

Target duration =

$$\frac{(\text{First duration} \times \text{First quantity}) + (\text{Second duration} \times \text{Second quantity})}{\text{First quantity} + \text{Second quantity}}.$$

In this embodiment, a manner of calculating the target duration is limited. This improves solution feasibility.

With reference to a fifth implementation of the first aspect, the first result further includes a third quantity, and the third quantity is a quantity of abnormal events that occur on the second node in the first time period and that each are of a same event type as the second abnormal event; and the second result further includes a fourth quantity, and the fourth quantity is a quantity of abnormal events that occur on the second node before the first time period and that each are of a same event type as the fourth abnormal event. The analysis device calculates the first result and the second result to obtain a target probability. The analysis device updates a probability of the target fault propagation path to the target probability.

In this embodiment, the probability of the target fault propagation path is updated to the target probability in an incremental update manner, to help improve accuracy of subsequent fault root cause determining.

With reference to a sixth implementation of the first aspect, the analysis device processes the first network data to obtain a first result. The first result includes the first fault propagation path and a third quantity, and the third quantity is a quantity of abnormal events that occur on the second node in the first time period and that each are of a same event type as the second abnormal event. The analysis device obtains historical results. The historical results include a second result, the second result includes the target fault propagation path and a fourth quantity, and the fourth quantity is a quantity of abnormal events that occur on the second node before the first time period and that are the same as abnormal events of the second node. The analysis device calculates the first result and the second result to obtain a target probability. The analysis device updates a probability of the target fault propagation path to the target probability.

In this embodiment, the probability of the target fault propagation path is updated to the target probability in an incremental update manner, to help improve accuracy of subsequent fault root cause determining.

With reference to a seventh implementation of the first aspect, the analysis device obtains the target probability through calculation in the following manner:

$$\text{Target probability} = \frac{\text{First quantity} + \text{Second quantity}}{\text{Third quantity} + \text{Fourth quantity}}.$$

In this embodiment, a manner of calculating the target probability is limited. This improves solution feasibility.

With reference to an eighth implementation of the first aspect, when the historical fault propagation paths do not include the target fault propagation path, the analysis device stores the first fault propagation path.

In this embodiment, when there is no historical record, the analysis device stores the first fault propagation path, to provide a new reference for subsequent fault locating.

With reference to a ninth implementation of the first aspect, the analysis device processes the first network data to obtain a first result. The first result includes the first fault propagation path and first duration, and the first duration is obtained by processing a first time interval between an alarm occurrence moment corresponding to a first fault of the first node on the first fault propagation path and an alarm occurrence moment corresponding to a second fault of the second node on the first fault propagation path in the first time period. The analysis device stores the first duration.

In this embodiment, when there is no historical record, the analysis device stores the first duration, to provide a new reference for subsequent fault locating.

With reference to a tenth implementation of the first aspect, the first result includes a first quantity and a third quantity, the first quantity is a quantity of first fault propagation paths in the first time period, and the third quantity is a quantity of abnormal events that occur on the second node in the first time period and that each are of a same event type as the second abnormal event. The analysis device stores a first probability of the first fault propagation path. The first probability is a probability that the second abnormal event of the second node is caused by the first abnormal event of the first node.

In this embodiment, when there is no historical record, the analysis device stores the first probability, to provide a new reference for subsequent fault locating.

With reference to an eleventh implementation of the first aspect, the analysis device processes the first network data based on a frequent subgraph mining algorithm to obtain the first fault propagation path.

In this embodiment, a manner of processing the first network data is limited. This improves solution feasibility.

With reference to a twelfth implementation of the first aspect, when there are a plurality of first time intervals on the first fault propagation path, the first duration is a maximum value or an average value of the plurality of first time intervals.

In this embodiment, a manner of processing a plurality of pieces of first duration is limited. This improves solution feasibility.

With reference to a thirteenth implementation of the first aspect, the analysis device sends a target result or the target fault propagation path to a cloud device.

A second aspect may provide a data processing method. The method includes: A collection device sends first network data to an analysis device, so that the analysis device processes the first network data to obtain a first fault propagation path. The first network data includes abnormal information and a connection relationship.

A third aspect may provide a data processing method. The method includes: A cloud device receives a target result sent by an analysis device. The target result includes at least one of a target fault propagation path, target duration, and a target probability.

A fourth aspect may provide an analysis device. The analysis device performs the method in the first aspect.

A fifth aspect may provide a collection device. The collection device performs the method in the second aspect.

A sixth aspect may provide a cloud device. The cloud device performs the method in the third aspect.

A seventh aspect may provide a computer storage medium. The computer storage medium stores instructions, and when the instructions are run on a computer, the computer is enabled to perform the method in the first aspect.

An eighth aspect may provide a computer program product. When the computer program product is run on a computer, the computer is enabled to perform the method in the first aspect.

DETAILED DESCRIPTION OF THE EMBODIMENTS

The embodiments may provide a data processing method and a related device, to implement efficiency that is higher than that of processing all network data, reduce storage costs by storing only a historical fault propagation path instead of storing all historical network data, and implement replicability and scalability.

The following describes in detail implementation principles, implementations, and beneficial effects of the solutions with reference to the accompanying drawings.

The method provided in the embodiments may be applied to various communications networks, for example, a data center network (DCN) and a mobile communications network. Devices in these communications networks may be connected to an analysis device, so as to update or add, by using the analysis device, a fault propagation path that can perform fault locating in these communications networks. In other words, an analysis device configured to update or add a fault propagation path may be a device independent of the communications network. Further, the analysis device configured to update or add a fault propagation path may alternatively be a device in the communications network. In other words, a device in the communications network may also be used to update or add a fault propagation path that can perform fault locating in the communications network.

Figure 1:
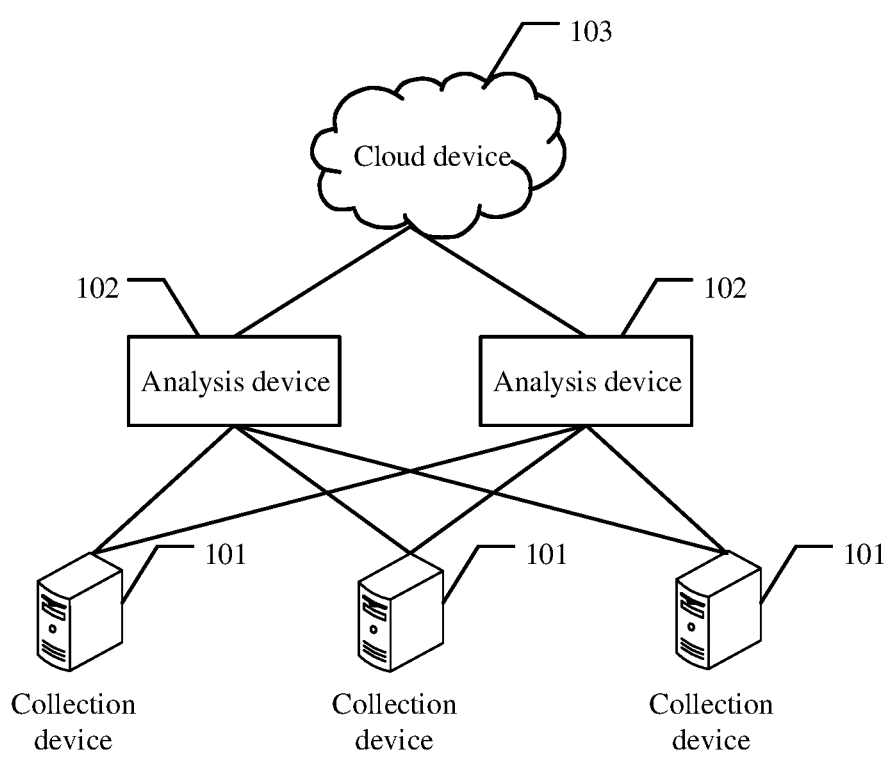
FIG. 1 is a schematic diagram of a network framework according to an embodiment.

FIG. 1 is a schematic diagram of a network architecture according to an embodiment. As shown in FIG. 1, the network architecture in this embodiment includes a collection device 101, an analysis device 102, and a cloud device 103.

In this embodiment, only three collection devices 101, two analysis devices 102, and one cloud device 101 are used as an example for description. During actual application, there may be more or fewer collection devices 101 and analysis devices 102, or more cloud devices 101.

A communication connection is established between one collection device 101 and one analysis device 102. Optionally, to improve reliability of communication between a collection device 101 and an analysis device 102, one collection device 101 may alternatively establish communication connections to two or more analysis devices 102, and one analysis device 102 may alternatively establish communication connections to two or more collection devices 101.

The collection device 101, the analysis device 102, and the cloud device 103 may be connected through a wired network or may be connected through a wireless network. If the wired network is used for connection, a general connection manner is a fiber optic network. If the wireless network is used for connection, a general connection manner is a wireless fidelity (Wi-Fi) network, a cellular wireless network, or a wireless network of another type.

The collection device 101 is responsible for collecting network data such as fault data and abnormal data in a communications network. Optionally, the collection device 101 provides the network data for the analysis device 102.

The analysis device 102 is responsible for extracting, updating, and adding fault propagation path information. Optionally, the analysis device 102 provides the fault propagation path information for the cloud device 103.

The cloud device 103 may be integrated into an operations support system (OSS), to present an updated fault propagation path result after summarization.

The analysis device 102 may be a server, a server cluster including several servers, or a cloud computing service center. The cloud device 103 may be a computer, a server, a server cluster including several servers, or a cloud computing service center. The cloud device 103 is deployed at a back end of a service network.

In this embodiment, if the collection device 101 is provided with a function of updating or adding a fault propagation path, the collection device 101 may be directly connected to the cloud device 103, and update or add a fault propagation path without using the analysis device 102.

The following describes data processing methods according to embodiments with reference to the network framework in FIG. 1.

Figure 2:
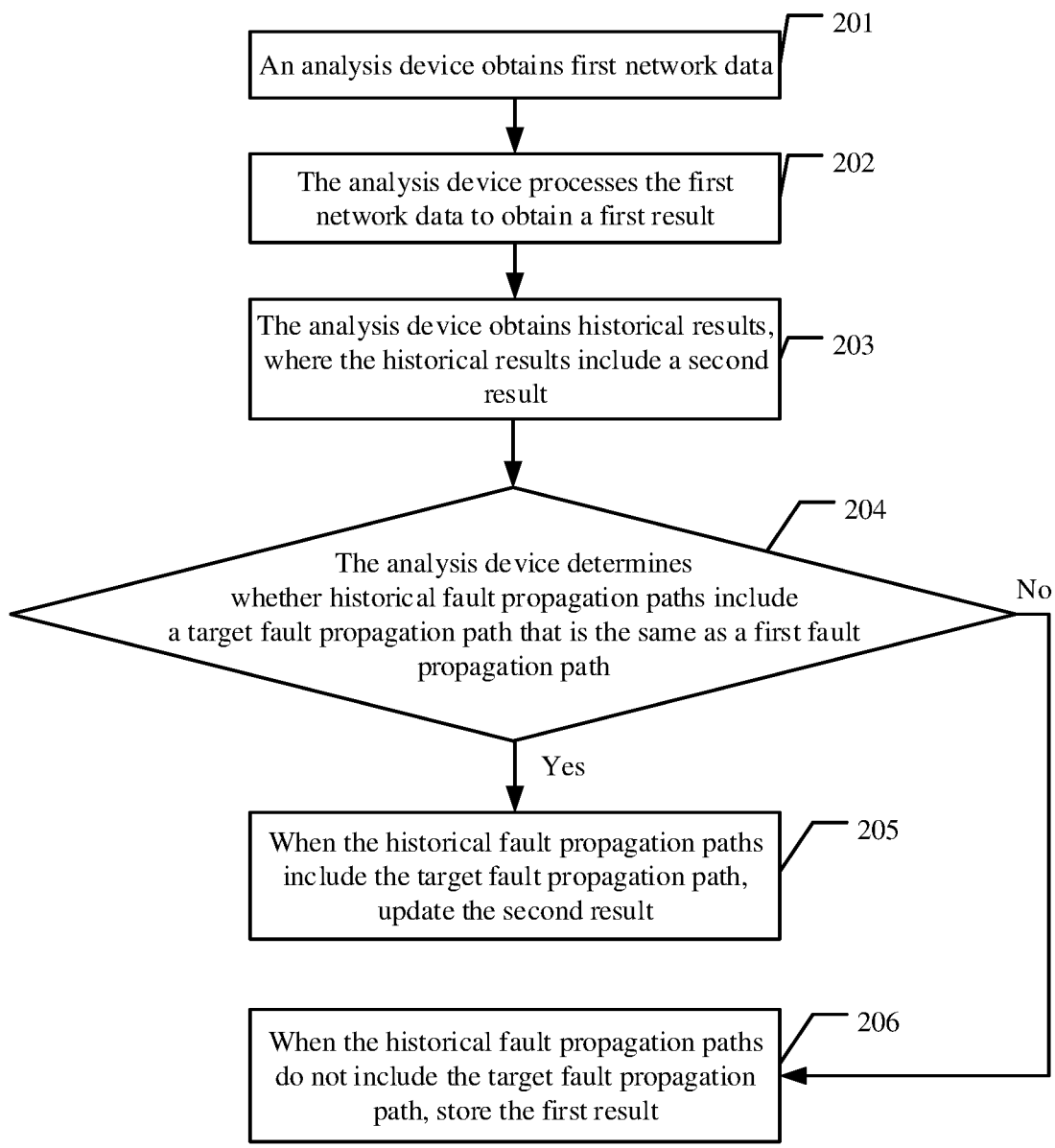
FIG. 2 is a schematic flowchart of a data processing method according to an embodiment.

As shown in FIG. 2, an embodiment of a data processing method according to embodiments may include the following steps.

201: An analysis device obtains first network data.

In this embodiment, the analysis device may obtain the first network data by using a network device or may obtain the first network data through manual input by operation and maintenance personnel. An obtaining manner is not limited herein. The network device may be a network device having a collection function, such as a router or a switch.

In this embodiment, the first network data is abnormal information of nodes in a first time period and a relationship between the nodes in a communications network. The abnormal information may be at least one type of information such as fault information, an alarm, a log, a network key performance indicator (KPI), or another event.

Different types of faults often occur in the communications network, and different faults may be caused by different reasons. For example, some faults are caused by hardware of a physical device, and some faults are caused by a protocol deployed on a physical device. Therefore, when an abnormal event related to a fault occurs in the communications network, a node related to the abnormal event may be a physical node such as a physical device, a board, or a physical port, or may be a related logical node such as an open shortest path first (OSPF) protocol, a border gateway protocol (BGP), a rapid ring protection protocol (RRPP), or a virtual local area network (VLAN), or may be a virtual node such as an L3link, an alarm, or a log.

There may be a plurality of event types in this embodiment. Table 1 shows common event types as examples.

TABLE 1

| Event type | A representation form of the event type |
| --- | --- |
| An interface is deleted | IF_DELETE |
| A neighbor status changes | NBR_CHANGE_E |

TABLE 1-continued

| Event type | A representation form of the event type |
|---|---|
| A port on an RRPP ring enters a forwarding state | PFWD |
| OSPF neighbor establishment interface configurations are inconsistent | ospfIfConfigError |
| An OSPF neighbor status changes | ospfNbrStateChange_active |
| An interface status changes | linkDown_active |
| A VXFAN tunnel status changes to "Down" | hwNvo3VxlanTnlDown |

It may be understood that Table 1 is merely an example of the event type and the representation form. During actual application, there may be another event type or another representation form. This is not limited herein.

202: The analysis device processes the first network data to obtain a first result.

In this embodiment, a manner in which the analysis device processes the first network data to obtain the first result is merely described by using a frequent subgraph mining algorithm as an example. It may be understood that, during actual application, there may be a plurality of manners, for example, technologies such as graph embedding and clustering. This is not limited herein.

In this embodiment, the frequent subgraph mining algorithm may be an algorithm such as gSpan or CloseGraph. This is not limited herein.

Figure 3:
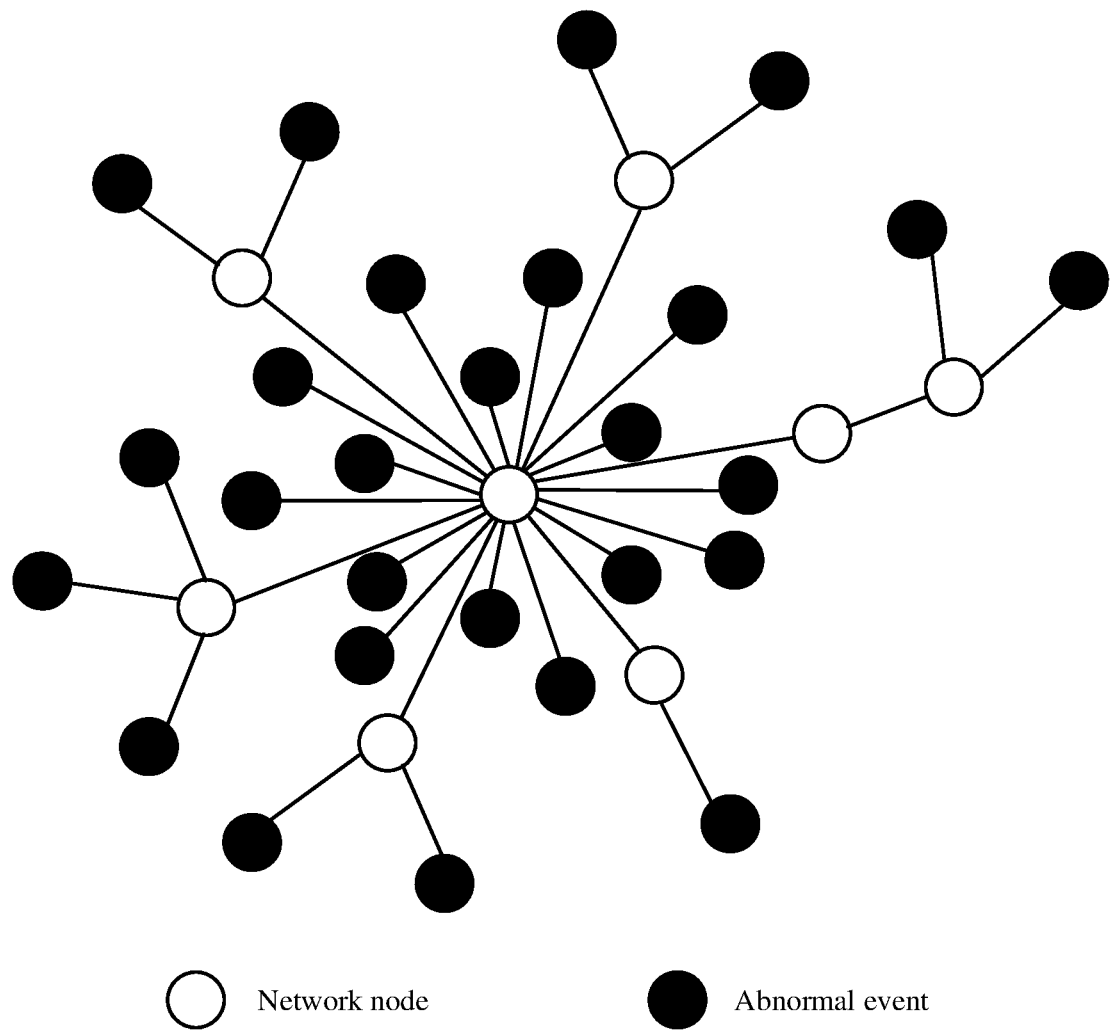
FIG. 3 is a schematic diagram of an event node connection graph according to an embodiment.

After obtaining the first network data, the analysis device extracts an abnormal event related to a fault and a node related to the abnormal event from the abnormal information. Therefore, an event node connection graph is generated based on a relationship between an extracted abnormal event and an extracted node related to the abnormal event. FIG. 3 shows a connection relationship between nodes and abnormal events that occur on the nodes. FIG. 3 is merely an example of one event node connection graph.

Optionally, the event node connection graph may be represented in a form of a graph, or may be represented in another form, for example, in a form of an entry. This is not limited herein.

Figure 4:
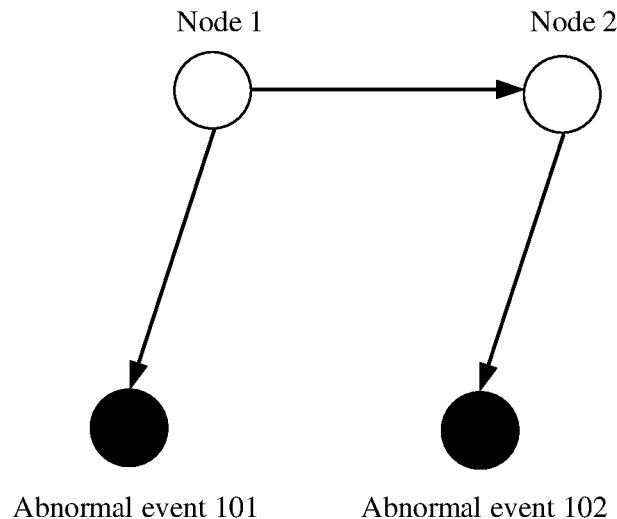
FIG. 4 is a schematic diagram of a fault propagation path according to an embodiment.

The analysis device extracts a common propagation path from all fault event node connection graphs by using the frequent subgraph mining algorithm. The common propagation path is a fault propagation path, and the fault propagation path indicates that an abnormal event of one node causes an abnormal event of another node. For example, a fault propagation path is extracted from a plurality of event node connection graphs that each are similar to the event node connection graph in FIG. 3. A form of the fault propagation path is shown in FIG. 4. An abnormal event 101 of a node 1 causes an abnormal event 102 of a node 2. A path connected between the node 1 and the node 2 does not include a node on which a fault alarm occurs. In other words, no fault-related event occurs on the path connected to the nodes, and the two nodes are directly connected. It is equivalent to that a hop count between the two nodes is 1. It may be understood that FIG. 4 is merely an example for description. A hop count between two nodes may alternatively be an integer greater than 1. This is not limited herein.

In this embodiment, the fault propagation path may be in a visual graph form, a text form, or another form. This is not limited herein.

For example, on the fault propagation path, the node 1 is a OSPF router (OsRouter), and the node 2 is a OSPF network segment (OsNetwork). In other words, the abnormal event 101 of the OsRouter causes the abnormal event 102 of the next OsNetwork that is adjacent to the OsRouter. A text form of the fault propagation path may be expressed as "OsRouter-OsNetwork".

A quantity of fault propagation paths extracted by the analysis device by using the frequent subgraph mining algorithm may be 0 or 1, or may be greater than 1. In addition, no fault propagation path may be extracted from some event node connection graphs, at least one fault propagation path may be extracted from some event node connection graphs, and a same fault propagation path may also be extracted from a plurality of event node connection graphs.

As shown in FIG. 4, the fault propagation path indicates that the abnormal event 101 of the node 1 causes the abnormal event 102 of the node 2. In other words, the node 1 represents a root cause entity node on which a fault event occurs.

Figure 5:
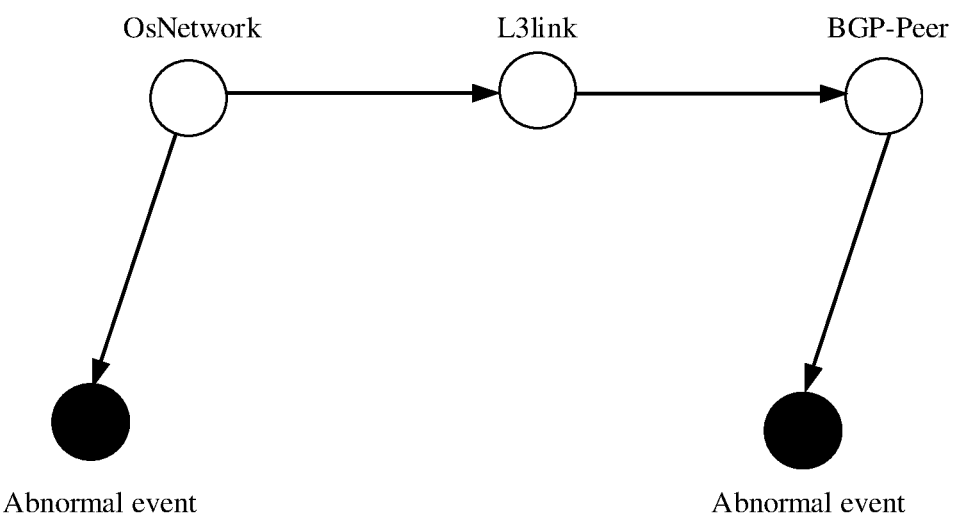
FIG. 5 is a schematic diagram of another fault propagation path according to an embodiment.

For example, a fault propagation path shown in FIG. 5 may be expressed as "OsNetwork-L3link-BGP-Peer", and the fault propagation path is used to indicate that a neighbor protocol state fault (an abnormal event) in an OSPF network segment (OsNetwork) causes IP unreachability (L3link) on a BGPLoopback interface, and finally causes BGP peer (BGP-Peer) linkdown (an abnormal event).

After determining a first fault propagation path, the analysis device may further determine an occurrence probability and/or duration of the first fault propagation path. In other words, in addition to the first fault propagation path, the first result may further include the occurrence probability and/or duration of the first fault propagation path. The analysis device may determine the occurrence probability (referred to as a first probability below) of the extracted first fault propagation path or may determine the fault propagation duration (referred to as first duration below) corresponding to the extracted first fault propagation path or may determine the first probability and the first duration that correspond to the extracted first fault propagation path. The first probability is a probability that a second abnormal event of a second node is caused by a first abnormal event of a first node.

Optionally, the analysis device determines, based on information about an abnormal event that is obtained from the first network data, that a time interval between an occurrence moment of the first abnormal event of the first node (that is, a start point) and an occurrence moment of the second abnormal event of the second node (that is, an end point) on the first fault propagation path is the first duration. For example, if the fault propagation path shown in FIG. 4 is the first fault propagation path, the analysis device determines that the first duration is the time interval between the occurrence moment of the first abnormal event (the abnormal event 101) of the first node (the node 1) and the occurrence moment of the second abnormal event (the abnormal event 102) of the second node (the node 2). For example, if the occurrence moment of the first abnormal event at the start point on the first fault propagation path is 11:25, and the event occurrence moment of the second abnormal event at the end point is 11:26:34, the first duration is 1 minute 34 seconds.

Optionally, the analysis device may determine a first quantity of first fault propagation paths and a third quantity of second abnormal events at the end point on the first fault propagation path based on the event node connection graph.

The analysis device determines the first probability in the following manner:

$$\text{First probability} = \frac{\text{First quantity}}{\text{Third quantity}}.$$

203: The analysis device obtains historical results, where the historical results include a second result.

The analysis device obtains historical fault propagation paths. Any fault propagation path in the historical fault propagation paths may be referred to as a second fault propagation path, the second fault propagation path is a fault propagation path that occurs before the first time period, and the second fault propagation path indicates that a third abnormal event of a third node causes a fourth abnormal event of a fourth node.

After obtaining the second fault propagation path, the analysis device may further obtain fault propagation duration (referred to as second duration below) of the second fault propagation path, a second quantity of second fault propagation paths that occur before the first time period, and a fourth quantity of fourth abnormal events that occur on the fourth node on the second fault propagation path before the first time period. In other words, the second result may be the second fault propagation path, or the second result may be the second fault propagation path and the second duration, or the second result may be the second fault propagation path, the second duration, the second quantity of second fault propagation paths, and the fourth quantity of fourth abnormal events that occur on the fourth node on the second fault propagation path.

In this embodiment, the second result or the historical result is obtained by processing historical network data. A processing manner may be technologies such as the frequent subgraph mining algorithm, graph embedding, and clustering. It may be understood that the second result or the historical result may be an updated result obtained through superimposing or may be a result obtained by processing all data. This is not limited herein.

204: The analysis device determines whether the historical fault propagation paths include a target fault propagation path that is the same as the first fault propagation path; and if yes, performs step 205; or if no, performs step 206.

The analysis device compares the second fault propagation paths with the first fault propagation paths in the historical fault propagation paths one by one.

The analysis device may determine whether the third node and the fourth node on the second fault propagation path are respectively consistent with the first node and the second node on the first fault propagation path, and determine whether the third abnormal event of the third node and the fourth abnormal event of the fourth node on the second fault propagation path are respectively of same event types as the first abnormal event of the first node and the second abnormal event of the second node on the first fault propagation path. It is assumed that a determining result is yes, for example, an abnormal event that occurs on the third node at 5:30 causes an abnormal event to occur on the fourth node at 6:00 on the second fault propagation path; an abnormal event 101 that occurs at the first node at 7:00 causes an abnormal event 102 to occur on the second node at 8:00 on the first fault propagation path; the first node and the third node are a same node, and the second node and the fourth node are a same node; and the abnormal event that occurs on the third node at 5:30 is of a same event type as the abnormal event 101, and the abnormal event that occurs on the fourth node at 6:00 is of a same event type as the abnormal event 102. In this case, the analysis device determines that the historical fault propagation paths include the target fault propagation path that is the same as the first fault propagation path. For example, the event types of the abnormal event 101 and the abnormal event that occurs on the third node at 5:30 each are "neighbor protocol state "down" in an OSPF network segment", and the event types of the abnormal event 102 and the abnormal event that occurs on the fourth node at 6:00 each are "BGP Loopback interface IP unreachable". In this case, the analysis device determines that the historical fault propagation paths include the target fault propagation path that is the same as the first fault propagation path.

The analysis device may further determine whether the second fault propagation path and the first fault propagation path pass through consistent nodes. If yes, the analysis device determines that the historical fault propagation paths include the target fault propagation path that is the same as the first fault propagation path.

An abnormal event or no abnormal event may occur on an intermediate node (a node other than the start point and the end point) through which the fault propagation path passes. This is not limited herein.

If abnormal events occur on nodes through which the second fault propagation path and the first fault propagation path pass, the analysis device may further determine whether the abnormal event that occurs on the node through which the second fault propagation path passes and the abnormal event that occurs on the node through which the first fault propagation path passes are of a same event type. If yes, the analysis device determines that the historical fault propagation paths include the target fault propagation path that is the same as the first fault propagation path.

The analysis device may further determine whether an order in which the second fault propagation path passes through nodes is consistent with an order in which the first fault propagation path passes through nodes. If yes, the analysis device determines that the historical fault propagation paths include the target fault propagation path that is the same as the first fault propagation path.

In this embodiment, there are a plurality of manners of determining whether the historical fault propagation paths include the target fault propagation path that is the same as the first fault propagation path. The foregoing manners are merely examples. This is not limited herein.

The second fault propagation path that is the same as the first fault propagation path is referred to as the target fault propagation path.

205: When the historical fault propagation paths include the target fault propagation path that is the same as the first fault propagation path, the analysis device updates the second result.

If the determining result in step 204 is yes, when determining that the historical fault propagation paths include the target fault propagation path that is the same as the first fault propagation path, the analysis device updates the second result. In other words, when the historical fault propagation paths include the target fault propagation path that is the same as the first fault propagation path, it indicates that there is a record before the first time period. In this case, the analysis device updates the second result.

For example, if a quantity of target fault propagation paths (that is, "OsRouter-OsNetwork") in the historical fault propagation paths that occur before the first time period is 150, and a quantity of first fault propagation paths (that is, "OsRouter-OsNetwork") that occur in the first time period is 10, the analysis device updates the quantity of target fault propagation paths "OsRouter-OsNetwork", that is, 150+10. In other words, the quantity of target fault propagation paths "OsRouter-OsNetwork" is 160.

Optionally, when the historical fault propagation paths include the target fault propagation path that is the same as the first fault propagation path, the analysis device may calculate target duration, and update the second duration to the target duration. For example, for "OsRouter-OsNetwork", "OsRouter-OsNetwork" includes the second duration in the second result and includes the first duration in the first result.

For example, the first result includes the first fault propagation path, the first duration, the first quantity, and the third quantity. Details are shown in Table 2.

TABLE 2

| First fault propagation path | First quantity | Third quantity | First duration |
|---|---|---|---|
| OsRouter-OsNetwork | 150 | 400 | 1 min |

For example, the second result includes the target fault propagation path, the second duration, the second quantity, and the fourth quantity. Details are shown in Table 3.

TABLE 3

| Target fault propagation path | Second quantity | Fourth quantity | Second duration |
|---|---|---|---|
| OsRouter-OsNetwork | 10 | 15 | 0.8 min |

There may be a plurality of manners in which the analysis device calculates the target duration. The following provides descriptions with reference to examples in Table 2 and Table 3.

1. The analysis device compares the second duration with the first duration and determines a maximum time interval in the second duration and the first duration as the target duration. In other words, the analysis device determines 1 minute as the target duration. When the second duration is greater than the first duration, the analysis device may not update the target duration. In this case, the target duration is the second duration, and there is a record before.

2. The analysis device may calculate the target duration in the following manner:

$$\text{Target duration} = \frac{(\text{First duration} \times \text{First quantity}) + (\text{Second duration} \times \text{Second quantity})}{\text{First quantity} + \text{Second quantity}}.$$

$$\text{Target duration} = \frac{(1 \times 150) + (0.8 \times 10)}{150 + 10} = 0.9875 \text{ min}.$$

In addition to the foregoing two manners of calculating the target duration, the target duration may be calculated in another manner. This is not limited herein.

Optionally, when the historical fault propagation paths include the target fault propagation path that is the same as the first fault propagation path, it indicates that the third abnormal event of the first node on the target fault propagation path and the first abnormal event of the first node on the first fault propagation path are of a same event type, and the fourth abnormal event of the second node on the target fault propagation path and the second abnormal event of the second node on the first fault propagation path are of a same event type. The analysis device may further calculate a target probability and update a probability of the target fault propagation path to the target probability.

The data in Table 2 and Table 3 is used as an example. The analysis device may calculate the target probability in the following manner:

$$\text{Target probability} = \frac{\text{First quantity} + \text{Second quantity}}{\text{Third quantity} + \text{Fourth quantity}}.$$

$$\text{Target probability} = \frac{150 + 10}{400 + 15} = 39\%.$$

In addition to the foregoing manner of calculating the target probability, the target probability may be calculated in another manner. This is not limited herein.

206: When the historical fault propagation paths do not include the target fault propagation path that is the same as the first fault propagation path, the analysis device stores the first result.

If the determining result in step 204 is no, when determining that the historical fault propagation paths do not include the target fault propagation path that is the same as the first fault propagation path, the analysis device stores the first result. In other words, when the historical fault propagation paths do not include the target fault propagation path that is the same as the first fault propagation path, it indicates that there is no record before the first time period. In this case, the analysis device stores the first result.

For example, FIG. 5 shows the first fault propagation path. In other words, the first fault propagation path is "OsNetwork-L3link-BGP-Peer". Because the first fault propagation path is not recorded before the first time period, the analysis device stores the first fault propagation path, in other words, adds the first fault propagation path to the record.

Optionally, when the historical fault propagation paths do not include the target fault propagation path that is the same as the first fault propagation path, a fault propagation time (the first duration) corresponding to the first fault propagation path is not recorded before the first time period, and the analysis device may store the first duration.

For example, the first result includes the first fault propagation path, the first duration, the first quantity, and the third quantity. Details are shown in Table 4.

TABLE 4

| First fault propagation path | First quantity | Third quantity | First duration |
|---|---|---|---|
| OsNetwork-L3link-BGP-Peer | 150 | 400 | 1 min |

In other words, the fault propagation time of the fault propagation path "OsNetwork-L3link-BGP-Peer" that is stored by the analysis device is 1 min.

Optionally, when the historical fault propagation paths do not include the second fault propagation path that is the same as the first fault propagation path, a probability (the first probability) corresponding to the first fault propagation path is not recorded before the first time period, and the analysis device may calculate or store the first probability.

Additionally, if the analysis device calculates the first probability in step 202, the analysis device may directly store the first probability. If the analysis device does not calculate the first probability in step 202, the analysis device may calculate the first probability in the manner of calculating the first probability in step 202. Details are not described herein again.

In this embodiment, step 203 may be performed before step 202, or may be performed before step 201, provided that step 203 is performed before step 204; and step 206 may be performed before step 205, provided that step 206 is performed after step 204.

If step 203 is performed after step 202, in step 203, the analysis device may also obtain a historical result corresponding to the start point on the first fault propagation path. This can reduce unnecessary data transmission and can further improve comparison efficiency in subsequent determining.

In this embodiment, a fault propagation path may be applied to fault locating. For example, for the fault propagation path "OsNetwork-L3link-BGP-Peer" shown in FIG. 5, if an abnormal event occurs on a BGP-Peer node, an L3link node connected to the BGP-Peer is found based on the fault propagation path shown in FIG. 5, an L3link node connected to the BGP-Peer is found, to query whether the L3link node is connected to an OsNetwork entity node, and detect whether an alarm exists on the OsNetwork entity node. If an alarm exists, the OsNetwork entity node is located as a fault root cause. In other words, it is found that BGP peer linkdown is caused by the neighbor protocol state "down" in the OSPF network segment.

Further, network nodes that will be affected may be predicted based on the fault propagation path, and a network fault propagation range may be delimited. In addition, efficiency and accuracy of subsequent fault root cause inference may be improved based on a fault propagation path, a probability, and propagation duration.

In this embodiment, the analysis device processes the first network data to obtain the first result related to the first fault propagation path, and then the analysis device obtains the historical results related to the historical fault propagation paths. If the historical fault propagation paths include the target fault propagation path that is the same as the first fault propagation path, the analysis device updates a quantity of target fault propagation paths. If the historical fault propagation paths do not include the target fault propagation path that is the same as the first fault propagation path, the analysis device stores the first fault propagation path. This avoids a case in which a new fault propagation path is obtained by processing all obtained historical network data and new network data during each fault locating.

In this embodiment, only the latest network data may be processed, and a historical fault propagation path is incrementally updated. Storage costs of all historical network data are reduced, and only a historical result related to a historical fault propagation path is stored. In addition, efficiency of fault locating is improved. In other words, efficiency of processing only new network data is higher than that of processing all historical network data and new network data.

Figure 6:
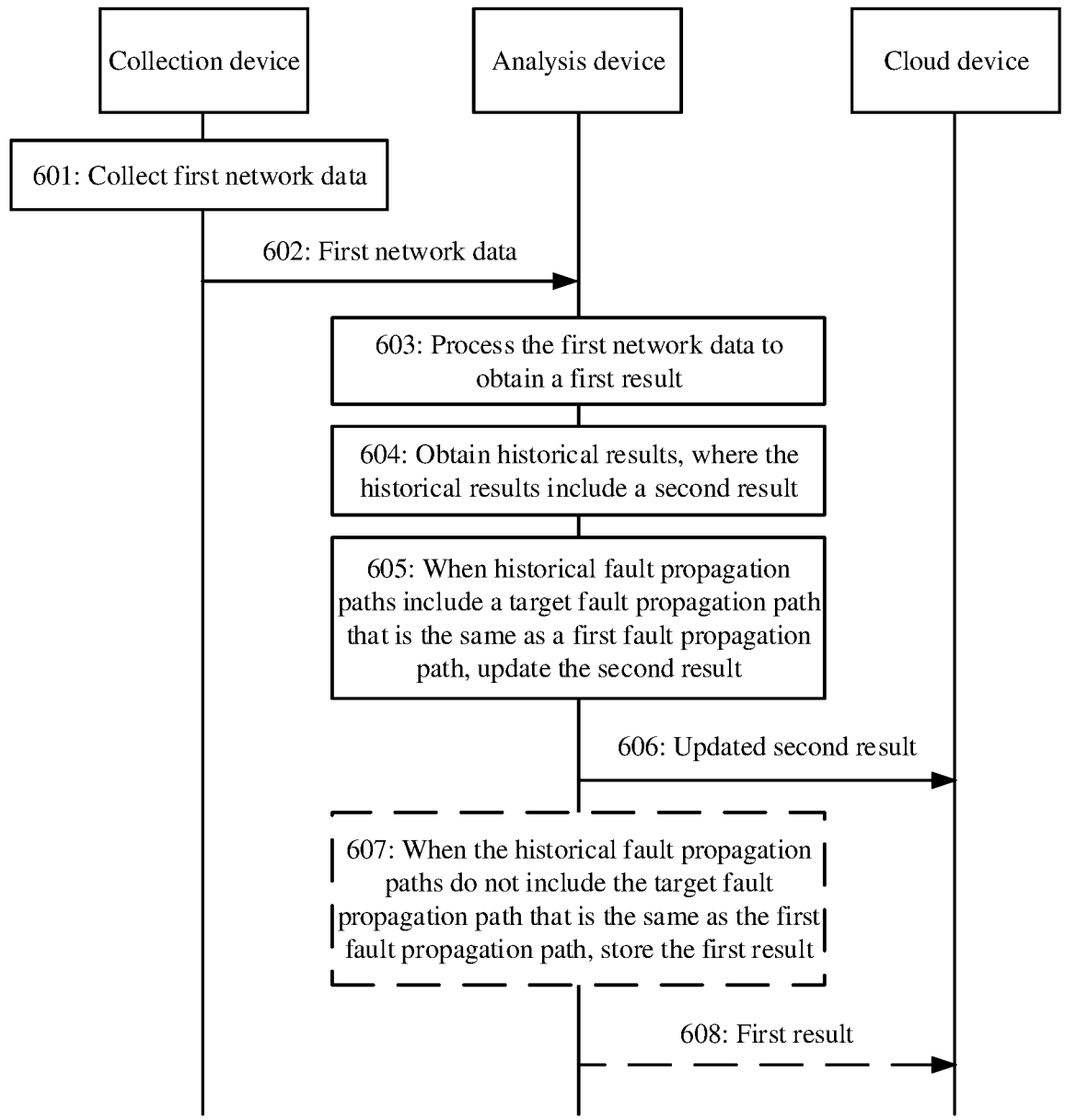
FIG. 6 is another schematic flowchart of a data processing method according to an embodiment.

According to the foregoing embodiment, an embodiment provides a procedure in which an analysis device separately interacts with a collection device and a cloud device as shown in FIG. 6. Another embodiment of a data processing method in the embodiments may include the following steps.

601: The collection device collects first network data.

When a fault occurs on a node in a communications network, the collection device collects information about an abnormal event related to the fault and a connection relationship between nodes in the network.

The information about the abnormal event may include at least one of fault information, an alarm, a KPI, a log, and the like.

For example, different types of faults such as a device restart and a Routerid conflict may occur in a data center network. Each type of fault may generate a plurality of pieces of alarm and log information. For example, a Routerid conflict may generate alarm and log information such as "an OSPF neighbor status changes" and "a state value of a BGP state machine changes."

In this embodiment, the connection relationship between the nodes in the network may be established by the collection device or may be established by another network device.

An establishment process may be: first extracting information about a related network entity object from the abnormal information according to a schema defined by an expert; then performing parsing to obtain network objects represented by structured json data; and recording the json objects in a graph database as nodes and establishing a connection relationship between the objects based on an attribute relationship between the objects. It should be understood that this manner is only one of a plurality of connection relationship establishment manners. It may be understood that, during actual application, the connection relationship may be established by using a structured data format or the like.

602: The collection device sends the first network data to the analysis device.

After collecting the first network data, the collection device sends the first network data to the analysis device.

603: The analysis device processes the first network data to obtain a first result.

604. The analysis device obtains historical results, where the historical results include a second result.

Step 603 and step 604 in this embodiment are similar to step 202 and step 203 in the foregoing embodiment shown in FIG. 2. Details are not described herein again.

605: When historical fault propagation paths include a target fault propagation path that is the same as a first fault propagation path, the analysis device updates the second result.

Step 605 in this embodiment is similar to step 205 in the foregoing embodiment shown in FIG. 2. Details are not described herein again.

606: The analysis device sends the updated second result to the cloud device.

After updating the second result, the analysis device may send the updated second result to the cloud device. After receiving the updated result, the cloud device may present information such as the updated fault propagation path after summarization.

Optionally, the cloud device is integrated into an OSS.

607: When the historical fault propagation paths do not include the target fault propagation path that is the same as the first fault propagation path, the analysis device stores the first result.

Step 607 in this embodiment is similar to step 206 in the foregoing embodiment shown in FIG. 2. Details are not described herein again.

608: The analysis device sends the first result to the cloud device.

After storing the first result, the analysis device may send the first result to the cloud device. After receiving the first result, the cloud device may present information such as the updated fault propagation path after summarization.

In this embodiment, step 606 may be performed after step 607, or may be performed after step 608, provided that step 606 is performed after step 605; and step 607 may be performed after step 608 or may be performed before step 606. This is not limited herein.

This embodiment may implement information exchange between the collection device and the analysis device and between the analysis device and the cloud device and reduces transmission of network data (all historical network data). In this embodiment, the analysis device may process only latest network data, incrementally update a historical fault propagation path, and transmit the historical fault propagation path to a cloud platform. The cloud platform may perform presentation. Storage costs of all historical network data are reduced, and only a historical result related to a historical fault propagation path is stored. In addition, efficiency of fault locating is improved. In other words, efficiency of processing only new network data is higher than that of processing all historical network data and new network data.

Figure 7:
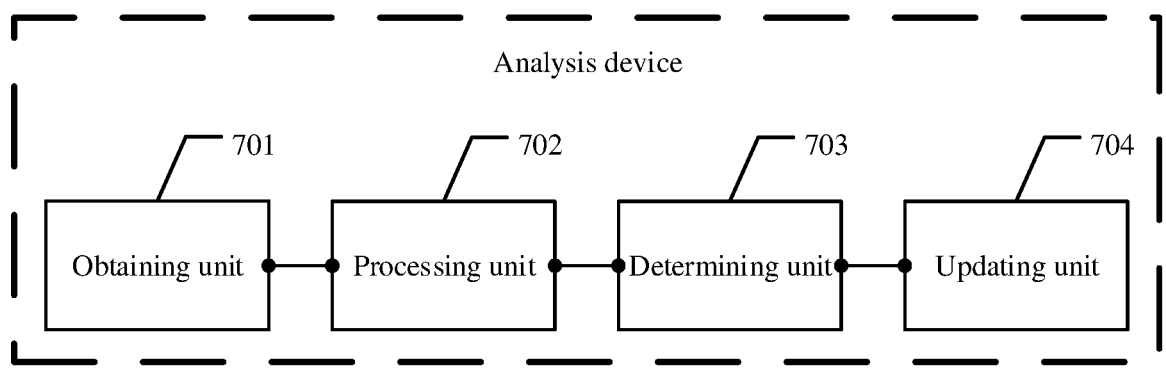
FIG. 7 is a schematic diagram of a structure of an analysis device according to an embodiment.

The foregoing describes the data processing methods in the embodiments, and the following describes analysis devices in the embodiments. As shown in FIG. 7, an embodiment of an analysis device in the embodiments includes an obtaining unit 701, a processing unit 702, a determining unit 703, and an updating unit 704.

The obtaining unit 701 is configured to obtain first network data, where the first network data includes information about abnormal events of a plurality of nodes in a network in a first time period and a connection relationship between the plurality of nodes.

The processing unit 702 is configured to process the first network data to obtain a first fault propagation path, where the first fault propagation path indicates that a first abnormal event of a first node causes a second abnormal event of a second node in the first time period, and the first node and the second node are any two different nodes in the plurality of nodes.

The obtaining unit 701 is further configured to obtain historical fault propagation paths.

The determining unit 703 is configured to determine whether the historical fault propagation paths include a target fault propagation path that is the same as the first fault propagation path, where the target fault propagation path indicates that a third abnormal event of the first node causes a fourth abnormal event of the second node before the first time period, the third abnormal event and the first abnormal event are of a same event type, and the fourth abnormal event and the second abnormal event are of a same event type.

The updating unit 704 is configured to: when the historical fault propagation paths include the target fault propagation path, update a quantity of target fault propagation paths.

In this embodiment, operations performed by the units in the analysis device are similar to those described in the foregoing embodiment shown in FIG. 2. Details are not described herein again.

In this embodiment, the obtaining unit 701 obtains the first network data and the historical fault propagation paths, and the processing unit 702 processes the first network data to obtain the first fault propagation path. When the historical fault propagation paths include the target fault propagation path that is the same as the first fault propagation path, the updating unit 704 updates the quantity of target fault propagation paths. This implements efficiency that is higher than that of processing all network data, reduces storage costs by storing only a historical fault propagation path instead of storing all historical network data, and implements replicability and scalability.

Figure 8:
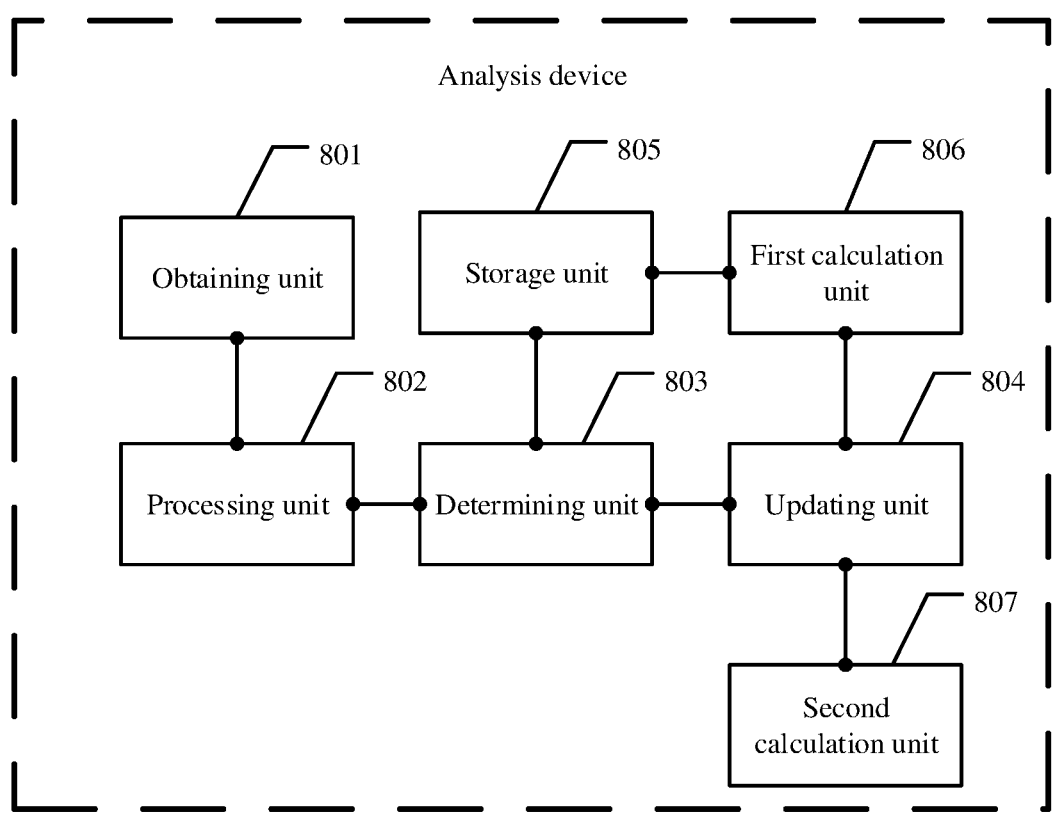
FIG. 8 is a schematic diagram of another structure of an analysis device according to an embodiment.

As shown in FIG. 8, another embodiment of an analysis device in the embodiments may include an obtaining unit 801, a processing unit 802, a determining unit 803, and an updating unit 804.

The obtaining unit 801 is configured to obtain first network data, where the first network data includes information about abnormal events of a plurality of nodes in a network in a first time period and a connection relationship between the plurality of nodes.

The processing unit 802 is configured to process the first network data to obtain a first fault propagation path, where the first fault propagation path indicates that a first abnormal event of a first node causes a second abnormal event of a second node in the first time period, and the first node and the second node are any two different nodes in the plurality of nodes.

The obtaining unit 801 is further configured to obtain historical fault propagation paths.

The determining unit 803 is configured to determine whether the historical fault propagation paths include a target fault propagation path that is the same as the first fault propagation path, where the target fault propagation path indicates that a third abnormal event of the first node causes a fourth abnormal event of the second node before the first time period, the third abnormal event and the first abnormal event are of a same event type, and the fourth abnormal event and the second abnormal event are of a same event type.

The updating unit 804 is configured to: when the historical fault propagation paths include the target fault propagation path, update a quantity of target fault propagation paths.

The analysis device in this embodiment further includes:
a storage unit 805, configured to: when the historical fault propagation paths do not include the target fault propagation path, store the first fault propagation path;
a first calculation unit 806, configured to calculate a first result and a second result to obtain target duration; and
a second calculation unit 807, configured to calculate the first result and the second result to obtain a target probability.

In this embodiment, operations performed by the units in the analysis device are similar to those described in the foregoing embodiment as shown in FIG. 2. Details are not described herein again.

In this embodiment, the first calculation unit 806 and the second calculation unit 807 may alternatively be a same calculation unit. This is not limited herein.

In this embodiment, the processing unit 802 processes the first network data to obtain the first result related to the first fault propagation path, and the obtaining unit 801 obtains historical results related to the historical fault propagation paths. If the historical fault propagation paths include the target fault propagation path that is the same as the first fault propagation path, the updating unit 804 updates the quantity of target fault propagation paths. If the historical fault propagation paths do not include the target fault propagation path that is the same as the first fault propagation path, the storage unit 805 stores the first fault propagation path. This avoids a case in which a new fault propagation path is obtained by processing all obtained historical network data and new network data during each fault locating, provides new reference data for subsequent fault root cause determining by updating a fault propagation path, duration, and a probability, and helps improve fault locating efficiency and accuracy.

Figure 9:
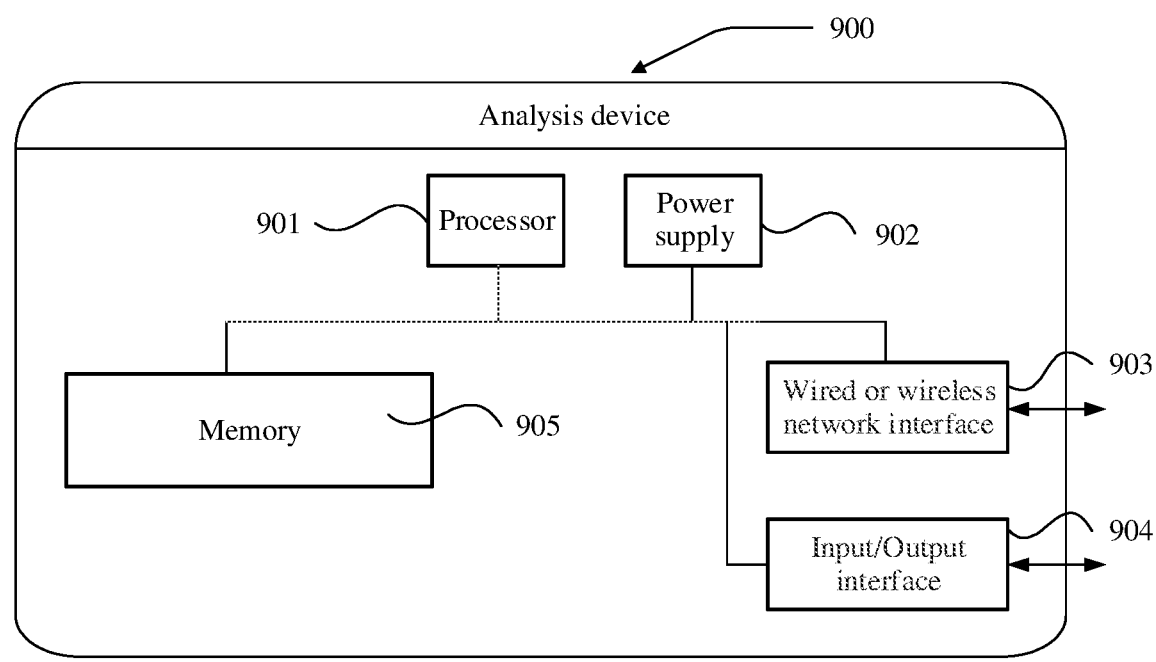
FIG. 9 is a schematic diagram of another structure of an analysis device according to an embodiment.

The following describes an analysis device in the embodiments as shown in FIG. 9.

The analysis device 900 may include one or more processors 901 and a memory 905, and the memory 905 stores one or more application programs or data.

The memory 905 may be a volatile memory or a persistent memory. The programs stored in the memory 905 may include one or more modules, and each module may include a series of instruction operations for the analysis device. Further, the processor 901 may be configured to communicate with the memory 905 and perform the series of instruction operations in the memory 905 on the analysis device 900.

The analysis device 900 may further include one or more power supplies 902, one or more wired or wireless network interfaces 903, one or more input/output interfaces 904, and/or one or more operating systems such as Windows Server™, Mac OS X™, Unix™, Linux™, and FreeBSD™.

The processor 901 may perform the operations performed by the analysis device in embodiments shown in FIG. 2 to FIG. 6. Details are not described herein again.

In the several embodiments provided the system, apparatus, and method may be implemented in another manner. For example, the described apparatus embodiment is merely an example. For example, unit division is merely logical function division and may be other division during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one place, or may be distributed on a plurality of network units. Some or all of the units may be selected according to actual requirements to achieve the objectives of the solutions of embodiments.

In addition, function units in the embodiments may be integrated into one processing unit, or each of the units may exist alone physically, or two or more units are integrated into one unit. The integrated unit may be implemented in a form of hardware or may be implemented in a form of a software function unit.

When the integrated unit is implemented in the form of a software function unit and sold or used as an independent product, the integrated unit may be stored in a computer-readable storage medium. Based on such an understanding, the solutions essentially, or the part contributing to the conventional technology, or all or some of the solutions may be implemented in a form of a software product. The computer software product is stored in a storage medium and may include several instructions to enable a computer device (which may be a personal computer, a server, a network device, or the like) to perform all or some of the steps of the methods described in the embodiments. The storage medium includes any medium that can store program code, such as a USB flash drive, a removable hard disk, a read-only memory (ROM), a random access memory (RAM), a magnetic disk, or a compact disc.

What is claimed is:

1. A data processing method, comprising:
   obtaining, by an analysis device, first network data, wherein the first network data comprises information about abnormal events of a plurality of nodes in a network in a first time period and a connection relationship between the plurality of nodes;
   processing, by the analysis device, the first network data to obtain a first fault propagation path, wherein the first fault propagation path indicates that a first abnormal event of a first node causes a second abnormal event of a second node in the first time period, and the first node and the second node are any two different nodes in the plurality of nodes;
   processing, by the analysis device, further comprise the first network data to obtain a first result, wherein the first result comprises the first fault propagation path and first duration, and the first duration is obtained by processing a first time interval between an occurrence moment of the first abnormal event of the first node on the first fault propagation path and an occurrence moment of the second abnormal event of the second node on the first fault propagation path in the first time period;
   obtaining, by the analysis device, historical fault propagation paths;
   determining, by the analysis device, whether the historical fault propagation paths comprise a target fault propagation path that is the same as the first fault propagation path, wherein the target fault propagation path indicates that a third abnormal event of the first node causes a fourth abnormal event of the second node before the first time period, the third abnormal event and the first abnormal event are of a same event type, and the fourth abnormal event and the second abnormal event are of a same event type;
   wherein the historical fault propagation paths further comprise:
   obtaining, by the analysis device, historical results, wherein the historical results comprise a second result, the second result comprises the target fault propagation path and second duration corresponding to the target fault propagation path, and the second duration is obtained by processing a second time interval between an occurrence moment of the third abnormal event and an occurrence moment of the fourth abnormal event before the first time period;
   when the historical fault propagation paths comprise the target fault propagation path, updating, by the analysis device, a quantity of the target fault propagation path; and
   calculating, by the analysis device, the first result and the second result to obtain target duration; and
   updating, by the analysis device, the second duration to the target duration.

2. The data processing method according to claim 1, wherein the target fault propagation path and the first fault propagation path pass through identical nodes.

3. The data processing method according to claim 1, wherein calculating, by the analysis device, the first result and the second result to obtain the target duration further comprises:
   using, by the analysis device, maximum duration in the first duration and the second duration as the target duration.

4. The data processing method according to claim 1, wherein the first result further comprises a first quantity, and the first quantity is a quantity of first fault propagation paths in the first time period; and the second result further comprises a second quantity, and the second quantity is a quantity of target fault propagation paths before the first time period; and calculating, by the analysis device, the first result and the second result to obtain the target duration further comprises:

obtaining, by the analysis device, the target duration through calculation in the following manner:

Target duration =
$$\frac{(\text{First duration} \times \text{First quantity}) + (\text{Second duration} \times \text{Second quantity})}{\text{First quantity} + \text{Second quantity}}.$$

5. The data processing method according to claim 1, wherein the first result further comprises a third quantity, and the third quantity is a quantity of abnormal events that occur on the second node in the first time period and that each are of a same event type as the second abnormal event; and the second result further comprises a fourth quantity, and the fourth quantity is a quantity of abnormal events that occur on the second node before the first time period and that each are of a same event type as the fourth abnormal event; and further comprising:

calculating, by the analysis device, the first result and the second result to obtain a target probability; and updating, by the analysis device, a probability of the target fault propagation path to the target probability.

6. The data processing method according to claim 5, wherein calculating, by the analysis device, the first result and the second result to obtain the target probability further comprises:

obtaining, by the analysis device, the target probability through calculation in the following manner:

$$\text{Target probability} = \frac{\text{First quantity} + \text{Second quantity}}{\text{Third quantity} + \text{Fourth quantity}}.$$

7. The data processing method according to claim 1, wherein after obtaining, by the analysis device, the historical fault propagation paths, further comprising:

when the historical fault propagation paths do not comprise the target fault propagation path, storing, by the analysis device, the first fault propagation path.

8. The data processing method according to claim 7, wherein processing, by the analysis device, the first network data to obtain the first fault propagation path further comprises:

processing, by the analysis device, the first network data to obtain a first result, wherein the first result comprises the first fault propagation path and first duration, and the first duration is obtained by processing a first time interval between an alarm occurrence moment corresponding to a first fault of the first node on the first fault propagation path and an alarm occurrence moment corresponding to a second fault of the second node on the first fault propagation path in the first time period; and further comprising:

storing, by the analysis device, the first duration.

9. The data processing method according to claim 7, wherein the first result comprises a first quantity and a third quantity, the first quantity is a quantity of first fault propagation paths in the first time period, the third quantity is a quantity of abnormal events that occur on the second node in the first time period and that each are of a same event type as second abnormal event; and further comprising:

storing, by the analysis device, a first probability of the first fault propagation path, wherein the first probability is a probability that the second abnormal event of the second node is caused by the first abnormal event of the first node.

10. An analysis device, comprising:

at least one processor; and a memory, coupled to the at least one processor and configured to store instructions that when executed by the at least one processor cause the analysis device to:

obtain first network data, wherein the first network data comprises information about abnormal events of a plurality of nodes in a network in a first time period and a connection relationship between the plurality of nodes;

process the first network data to obtain a first fault propagation path, wherein the first fault propagation path indicates that a first abnormal event of a first node causes a second abnormal event of a second node in the first time period, and the first node and the second node are any two different nodes in the plurality of nodes;

process the first network data to obtain a first result, wherein the first result comprises the first fault propagation path and first duration, and the first duration is obtained by processing a first time interval between an occurrence moment of the first abnormal event of the first node on the first fault propagation path and an occurrence moment of the second abnormal event of the second node on the first fault propagation path in the first time period;

obtain historical fault propagation paths;

determine whether the historical fault propagation paths comprise a target fault propagation path that is the same as the first fault propagation path, wherein the target fault propagation path indicates that a third abnormal event of the first node causes a fourth abnormal event of the second node before the first time period, the third abnormal event and the first abnormal event are of a same event type, and the fourth abnormal event and the second abnormal event are of a same event type;

obtain historical results, wherein the historical results comprise a second result, the second result comprises the target fault propagation path and second duration corresponding to the target fault propagation path, and the second duration is obtained by processing a second time interval between an occurrence moment of the third abnormal event and an occurrence moment of the fourth abnormal event before the first time period;

when the historical fault propagation paths comprise the target fault propagation path, a quantity of the target fault propagation path;

calculate the first result and the second result to obtain target duration; and update the second duration to the target duration.

11. The analysis device according to claim 10, wherein the first result further comprises a third quantity, and the third quantity is a quantity of abnormal events that occur on the second node in the first time period and that each are of a same event type as the second abnormal event; and the second result further comprises a fourth quantity, and the fourth quantity is a quantity of abnormal events that occur on the second node before the first time period and that each are of a same event type as the fourth abnormal event; and wherein when executed by the at least one processor, the instructions further cause the analysis device to:
    calculate the first result and the second result to obtain a target probability; and
    update a probability of the target fault propagation path to the target probability.

12. The analysis device according to claim 10, wherein, when executed by the at least one processor, the instructions further cause the analysis device to:
    process the first network data to obtain the first result, wherein the first result comprises the first fault propagation path and a third quantity, and the third quantity is a quantity of abnormal events that occur on the second node in the first time period and that each are of a same event type as the second abnormal event;
    obtain historical results, wherein the historical results comprise the second result, the second result comprises the target fault propagation path and a fourth quantity, and the fourth quantity is a quantity of abnormal events that occur on the second node before the first time period and that are the same as abnormal events of the second node;
    calculate the first result and the second result to obtain a target probability; and
    update a probability of the target fault propagation path to the target probability.

13. The analysis device according to claim 10, wherein, when executed by the at least one processor, the instructions further cause the analysis device to when the historical fault propagation paths do not comprise the target fault propagation path, store the first fault propagation path.

14. The analysis device according to claim 13, wherein, when executed by the at least one processor, the instructions further cause the analysis device to:
    process the first network data to obtain a first result, wherein the first result comprises the first fault propagation path and first duration, and the first duration is obtained by processing a first time interval between an alarm occurrence moment corresponding to a first fault of the first node on the first fault propagation path and an alarm occurrence moment corresponding to a second fault of the second node on the first fault propagation path in the first time period; and
    store the first duration.

15. The analysis device according to claim 14, wherein the first result comprises a first quantity and a third quantity, the first quantity is a quantity of first fault propagation paths in the first time period, and the third quantity is a quantity of abnormal events that occur on the second node in the first time period and that each are of a same event type as the second abnormal event; and the second result further comprises a fourth quantity, and the fourth quantity is a quantity of abnormal events that occur on the second node in the first time period and that each are of a same event type as the second abnormal event; and wherein when executed by the at least one processor, the instructions further cause the analysis device to:
    store a first probability of the first fault propagation path, wherein the first probability is a probability that the second abnormal event of the second node is caused by the first abnormal event of the first node.

16. A non-transitory computer storage medium storing instructions, wherein when the instructions are executed on a computer, the computer is enabled to:
    obtain first network data, wherein the first network data comprises information about abnormal events of a plurality of nodes in a network in a first time period and a connection relationship between the plurality of nodes;
    process the first network data to obtain a first fault propagation path, wherein the first fault propagation path indicates that a first abnormal event of a first node causes a second abnormal event of a second node in the first time period, and the first node and the second node are any two different nodes in the plurality of nodes;
    process the first network data further comprise to obtain a first result, wherein the first result comprises the first fault propagation path and first duration, and the first duration is obtained by processing a first time interval between an occurrence moment of the first abnormal event of the first node on the first fault propagation path and an occurrence moment of the second abnormal event of the second node on the first fault propagation path in the first time period;
    obtain historical fault propagation paths;
    determine whether the historical fault propagation paths comprise a target fault propagation path that is the same as the first fault propagation path, wherein the target fault propagation path indicates that a third abnormal event of the first node causes a fourth abnormal event of the second node before the first time period, the third abnormal event and the first abnormal event are of a same event type, and the fourth abnormal event and the second abnormal event are of a same event type; and
    wherein the historical results further comprise a second result, the second result comprises the target fault propagation path and second duration corresponding to the target fault propagation path, and the second duration is obtained by processing a second time interval between an occurrence moment of the third abnormal event and an occurrence moment of the fourth abnormal event before the first time period;
    calculate the first result and the second result to obtain target duration; and
    update the second duration to the target duration.

* * * * *